July 12, 1966 T. W. HOWARD 3,260,563
PRODUCTION OF COMPOSITE CINEMATOGRAPH FILMS
Filed May 6, 1963
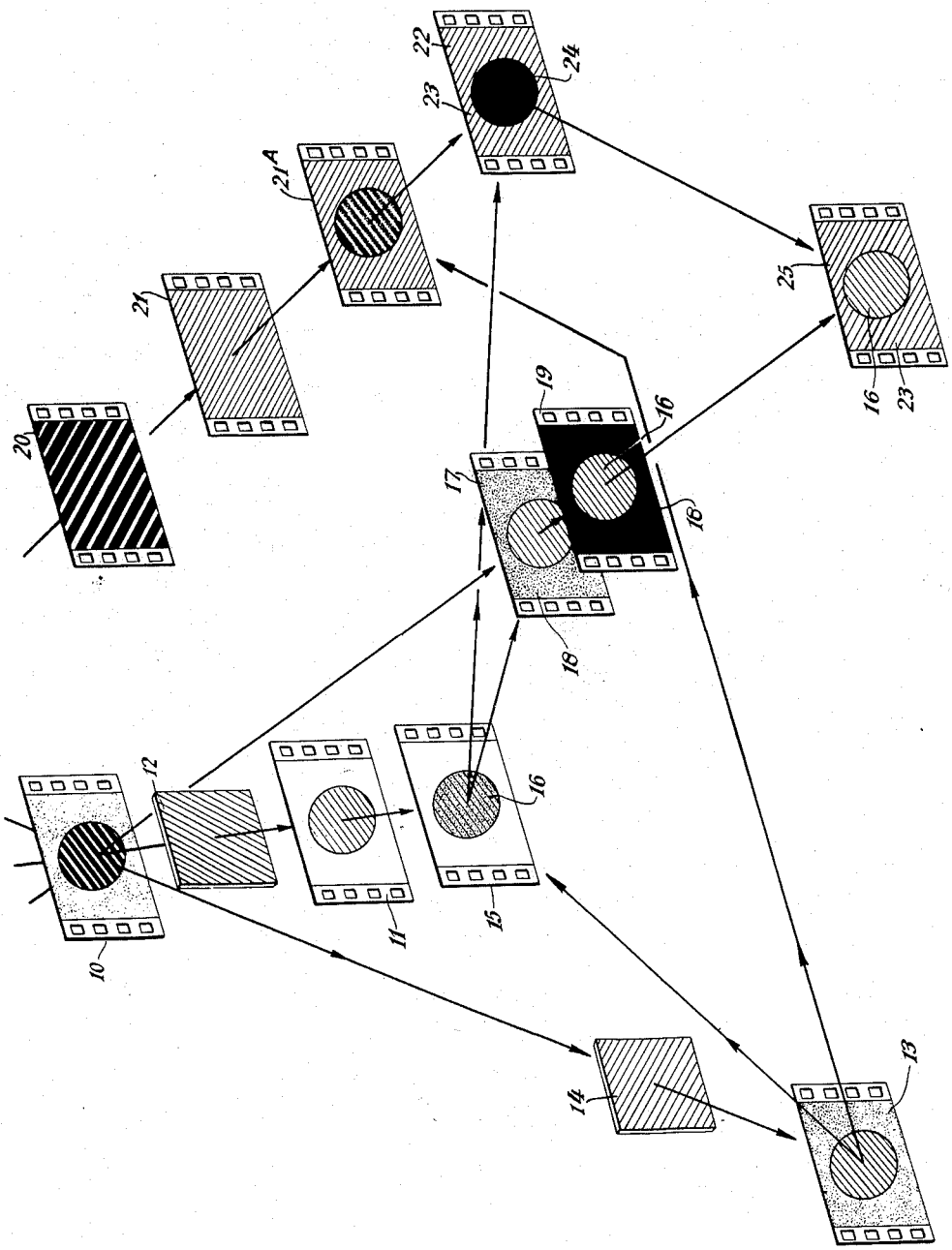
INVENTOR
Thomas William Howard
BY Stevens, Davis, Miller & Mosher
ATTORNEYS United States Patent Office 3,260,563
Patented July 12, 1966

3,260,563
PRODUCTION OF COMPOSITE CINEMATO-
GRAPH FILMS
Thomas William Howard, Bushey, England, assignor of one-half to Metro-Goldwyn-Mayer British Studios Limited, Elstree Way, Boreham Wood, County of Hertford, England
Filed May 6, 1963, Ser. No. 278,099
6 Claims. (Cl. 352—45)

This invention relates to the production of cinematograph or television films, in particular to the process of composite photography known as "travelling matte."

Various travelling matte systems are employed in film production, to combine a number of separately photographed different scenes into a composite single scene.

The present invention permits improvements to the known techniques of travelling matte whereby the visual photographic result is improved so that fine detail and original tonal range of the separately photographed scenes is substantially preserved. Improvements in the technique are such that the number of components and operations in the process are substantially reduced.

The silhouette masks normally necessary with known travelling matte systems are eliminated as separate components in the improved process.

The travelling matte process has been described by the present inventor in trade publications such as the July 1941 issue of the Association of Cine Technicians Journal, the January 1941 issue of Kine Weekly," and the July 1942 issue of the British Kinematograph Society's Journal.

In previous systems the travelling matte masks or silhouettes have been manufactured either with a separate film in the beam splitting camera equipment, or have been extracted by laboratory processes from the negatives or prints by the separately photographed scenes. With the present invention, the masking of the separate scenes to provide a composite single scene is done in such a manner as to eliminate the necessity for manufacturing separate silhouette masks.

In the known processes of travelling matte, the production of the separate masking films necessitates critical alignment of the separately photographed images to fit the masking films. The present invention substantially reduces the necessity for such critical operation by the elimination of these separate silhouette masks. In eliminating complementary silhouettes, the operation procedure time is considerably reduced. The present invention, in reducing the number of steps for combining the separately photographed scenes, also provides a substantial reduction in cost, and the main advantages of the present invention are achieved by producing the composite picture from components of the original negative of the separate scenes with masks already exposed into them.

The invention will now be described with reference to the accompanying drawing, the single figure of which is a flow diagram showing the various steps in the process of the invention.

In the following description it has been assumed that a scene is photographed using a normal motion picture camera with a single multilayer colour negative or reversal colour positive film. The scene is photographed against a plain coloured background, the illumination of the scene being provided by either direct daylight or if an interior, the backing and foreground scene can be lit with incandescent or arc lights. The plain background colour is chosen to be substantially complementary to the predominating colours of the foreground scene against the plain backing. It will be appreciated that if the foreground colours of the scene are predominantly yellow, red and orange then the background plain colour should be substantially blue so as to give the best colour separation. It is, however, to be appreciated that these colours are merely used by way of example and that the plain colour backing should be selected so as to best suit its colour separation from the colours of the foreground scene.

The final composite film showing the desired foreground scene against the desired background scene is produced from two integrally matted films relating respectively to the foreground and background scenes. The various steps in the production of these two integrally matted films will now be described in detail with reference to the drawings.

As previously mentioned the foreground scene is photographed with a multilayer colour film and the film is then developed in a conventional film processing equipment. The developed negative exposure is shown on the drawings by the reference 10 and this exposure is, in fact, used as the basic component in the production of the integral mattes to be hereinafter described.

The next step in the process is the extraction i.e., exposure from the developed negative exposure 10 of a first component shown by the reference 11. This component 11 is obtained by contact printing from the original multilayer colour film 10 and it is exposed through a broad band blue filter 12 on to a panchromatic black and white, or a blue sensitive film so as to produce a blue i.e. background separation, film 11. The film 11 is left undeveloped at this stage in the process for a purpose to be hereinafter described. The undeveloped blue separation film 11 can be obtained as described above using a black and white panchromatic film, or an integral multilayer colour film with the appropriate broad band filter 12.

A second component indicated by the reference numeral 13 is also exposed from the developed negative exposure film 10. The component 13 is, for purposes of illustration, a red i.e. foreground extraction and it is obtained by contact printing through a broad band red filter 14 onto a panchromatic black and white film. After exposure this component is developed in a conventional black and white developing machine to a density sensitometrically chosen for subsequent superimposition onto the undeveloped film 11 as will be hereinafter described. In the drawing the red extraction film 13 is shown developed so as to make a positive print.

A synchronised exposure is now made in a printing machine from the red separation positive film 13 onto the undeveloped blue extraction separation film 11. The sole purpose of this stage in the process is to provide added exposure areas to the component or film 11 prior to the development of the film 11. It will be appreciated that the films 11 and 13 were produced directly from the original negative film 10 on a contact printer or projection printer where alignment to the original negative film 10 was precise. The undeveloped film 11 and the positive exposure 13 will therefore geometrically register with each other providing frame by frame synchronisation is maintained of each component in relation to the original negative film. The superimposed result produces after development the combined exposure 15. As shown in the drawing this combined developed film 15 shows a black silhouette or image of the foreground object on a completely clear or transparent background. The black image 16 as now shown on the composite film 15, being a silhouette is now used to provide an integral masking of the background scene or area as will be hereinafter described.

In carrying out the next step in the process we again revert to the original developed negative film 10. A full colour master positive film is exposed from the negative film 10 using a full colour integral tripack film. This full colour master positive film is shown by the reference 17 on the drawing and in the preferred process the film is a duplicating colour positive film. The film 17 is made at the correct sensitometrically selected exposure but for the moment is not developed as the process first includes additional exposures from other components. It will be appreciated that if the film 17 were to be immediately developed after exposure from the film 10 then the plain backing area 18 would appear visual blue and this would not be sufficient masking of the background area as required in the production of the integral matte. The component or film 15 is now superimposed on the undeveloped positive film 17 and the film 17 is then subjected to a further exposure. As previously mentioned the film 15 has a clear or transparent background around the silhouette image 16 and which corresponds to the plain backing area of the original negative film 10, which area is of course recorded on the positive film 17 as the visual blue surround 18 to the foreground scene. The added exposure which results when the film 15 has been overlaid on the film 17 is, of course, in the same synchronized geometric relationship to the film 17 so that the printing light passes through the clear or transparent area of the film 15 and falls on the blue background area 18 of the film 17.

The positive film 17 after this added exposure is now developed to produce the film 19 and it will be seen that the surrounding or background area 18 is now turned to a very heavy density which visually appears to be black. This black area 18 surrounding the foreground image 16 now becomes the built-in protective matted area or integral mask for the background scene in the preparation of the final composite film as will be hereinafter described.

The second stage in the preparation of the composite film is the making of a master positive film of the desired background scene and which includes an integral mask corresponding to the desired foreground scene as shown on the negative film 10.

First of all the desired background scene is separately photographed so as to produce the developed negative exposure of a desired background as shown by the reference 20. The developed negative film is then exposed on a contact or projection printer in the usual manner and the resulting full colour master positive film 21 is left undeveloped. The undeveloped positive film 21 is now exposed with a component preferably extracted from the developed negative exposure 10, but for purposes of illustration this component is indicated as being the developed positive print 13 which comprises the red extraction from the film 10. The film 13 is synchronously overlaid on the undeveloped master positive film 21, exposed and the resulting positive film 21A is then developed. It will be appreciated that the resulting positive film 21A will be only partially matted with regard to the foreground image and it is not suitable for use as the second or other part of the final composite film until further protection has been given to the area which the foregoing object is to occupy. To provide this additional protection the developed positive film 21A is therefore further processed on a contact or projection printer by exposing film so far produced with the composite film 15 of the foreground object. The film 15 is synchronously overlaid on the positive film 21A so far produced and an exposure is made on to a duplicating colour negative film. The resulting film 22 is a composite duplicate negative with the background area only exposed on to it. The background area 23 corresponds to the desired background scene which will ultimately form part of the composite film while the foreground area 24 is completely masked in the same way as the background area 18 on the film 19 of the foreground scene.

The final step in the process is the assembly of the composite negative film from the developed film 19 of the foreground scene and the undeveloped film 22 of the background scene. To complete the assembly of the films the undeveloped film 22 is wound back and an exposure is superimposed on to it from the already integrally matted film 19. No further protection or separate mattes are necessary. It will, of course, be understood that the final step in the assembly can be made by producing the composite duplicate mutlilayer colour negative film from an exposure from the film 19 and thereafter an additional exposure is made from the developed film 22.

The resulting composite film 25 shows the desired foreground scene 16 against the desired background scene 23 without any obvious junction between the two scenes.

It will be appreciated that the invention relies on partial matting at various stages in the process of producing a composite negative or positive motion picture or television film. This partial matting is subject to variation as need dictates. Modifications can be made by using other extraction films to produce the partial mattes. The invention thereby permits considerable changes in the process which by experience can provide variation in colour, intensity and definition of the final composite film. The reduction in steps in the process has improved both the speed and accuracy of the assembly of the components into the composite and has also improved the preservation of fine details in the foreground object or group.

The invention thus provides a process for producing partial integral and separate mattes. The invention hereinbefore described is an improved method of motion picture travelling matte technique wherein partial silhouette masks are produced integrally in the component colour negative or positive foreground and background scenes. Two or more separately photographed cinematograph or television motion picture scenes or components may be combined in a composite negative or positive single visual image, either in colour or black and white. The important advantages are:

(1) The partial masking of a positive image component background scene 21 before development by the addition of an exposure from component 13 which is of a broad spectral band colour separation exposure, such as red, green, or blue, from a cinematograph or television colour negative foreground component scene is by double exposure on the said positive image component background scene 21 to produce, after development, a partially masked background scene 21A.

(2) The partial masking of a foreground component colour positive or reversal colour negative image before development by the exposure of a broad spectral band separation exposure, such as red, green or blue onto a separate cinematograph or television film which after development is exposed by optical or contact printing onto the said colour positive or reversal colour negative image component film before development.

(3) The process may also be carried out as above using the so-called cyan and magenta compound broadband colour filters.

I claim:

1. In motion picture photography, a travelling matte process for combining at least two separately photographed different scenes into a composite single film, which process comprises the steps of separately photographing a desired foreground scene and a desired background scene so as to produce first and second original color negative films respectively, the desired foreground scene being photographed against a plain backing of a color chosen to be complementary to the predominating colors of the foreground scene, exposing a first component film from the developed first negative film, said first component film being left undeveloped, said first component film being exposed so that the background is not exposed, exposing a second component film from the developed first negative film, said second component film being exposed so that the background is exposed, said second component film being developed, said second component film being synchronously overlaid and exposed on said first component film, said first component film being developed to produce a combined developed film in which the desired foreground scene is shown on a transparent background, producing an undeveloped first color positive film from the original developed first negative film, synchronously overlaying said combined film on said undeveloped first color positive film, exposing said overlaid films, subsequently developing said first color positive film to produce a film in which the background area surrounding the desired foreground scene is completely integrally masked, producing a second color positive film which is left undeveloped from said second color negative film, overlaying the developed second component film on said undeveloped second color positive film, exposing said overlaid films, developing said second color positive film, said second color positive film being a background scene with an integral foreground mask, overlaying the combined film on the developed second positive film, exposing said overlaid films so as to produce a composite undeveloped negative film in which the foreground area corresponding to the foreground scene is completely masked; said composite single film being produced by the exposure of the undeveloped negative film in which the foreground area is completely masked with the synchronously overlaid developed first color positive film.

2. A traveling matte process as claimed in claim 1, wherein the foreground colors of the foreground scene are predominantly red, yellow and orange and the background color is substantially blue.

3. A traveling matte process as claimed in claim 2, wherein the first component film extracted from the original negative film of the foreground scene is a color positive film obtained by the use of substantially blue filtered light.

4. A traveling matte process as claimed in claim 1, wherein the second component film extracted from the original negative film of the foreground scene is a color positive film obtained by the use of substantially red filtered light.

5. A traveling matte process as claimed in claim 2, wherein the second component film extracted from the original neagtive film of the foreground scene is a color positive film obtained by the use of substantially red filtered light.

6. A traveling matte process as claimed in claim 1 in which the original developed color negative films of the foreground and background scenes comprise reversal positive films.

References Cited by the Examiner

FOREIGN PATENTS 787,759    12/1957    Great Britain.

NORMAN G. TORCHIN, *Primary Examiner.*

R. L. STONE, *Examiner.*

C. VAN HORN, *Assistant Examiner.*